Feb. 23, 1943.  A. L. SIMISON  2,311,704
METHOD OF MAKING PARALLEL FIBER UNITS
Filed Sept. 3, 1940
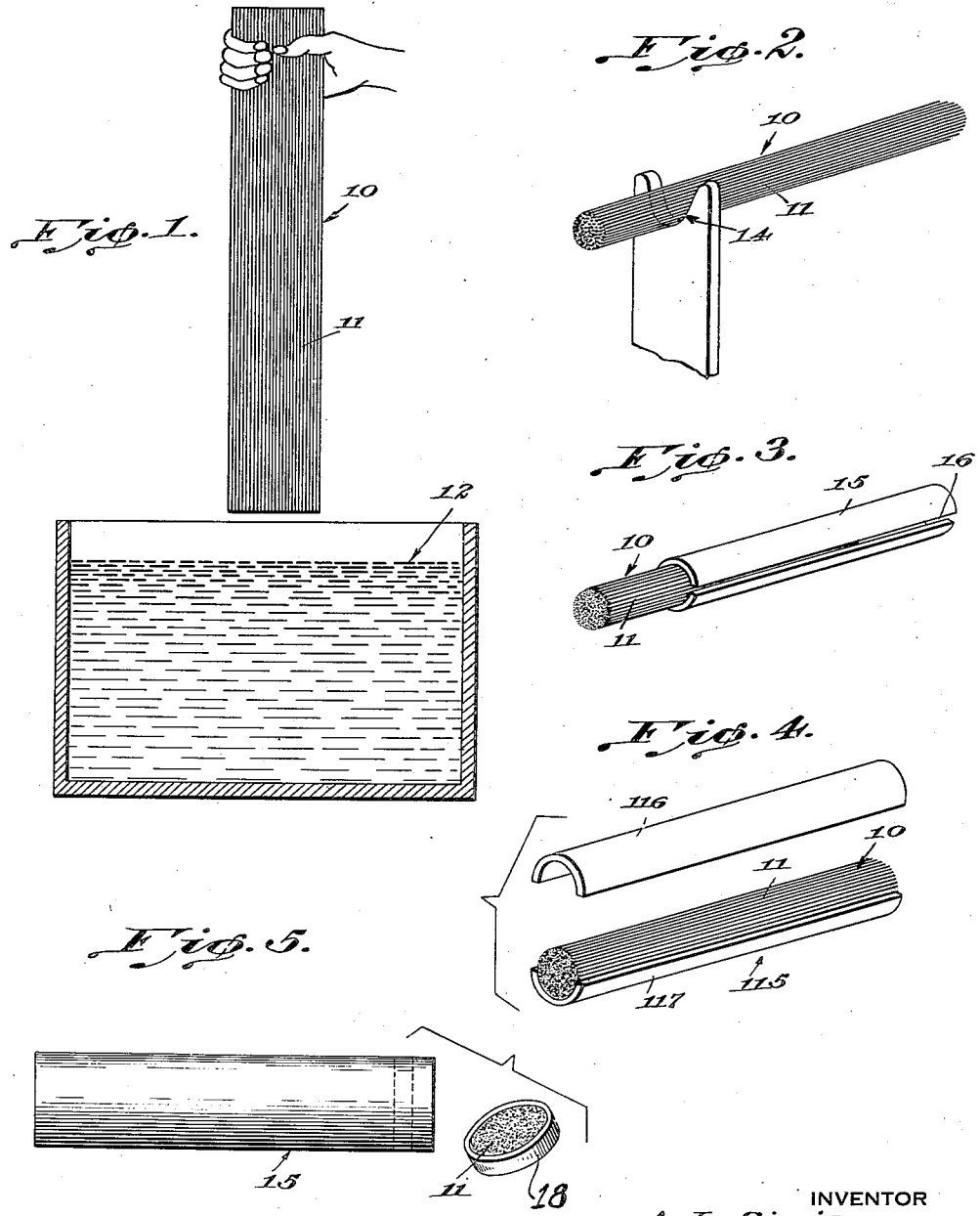
INVENTOR
A. L. Simison,
BY
ATTORNEY Patented Feb. 23, 1943

2,311,704

UNITED STATES PATENT OFFICE 2,311,704

METHOD OF MAKING PARALLEL FIBER UNITS

Allen L. Simison, Newark, Ohio, assignor to Owens-Corning Fiberglas Corporation, a corporation of Delaware Application September 3, 1940, Serial No. 355,130

6 Claims. (Cl. 210—205)

This invention relates to parallel fiber products and their manufacture, and particularly to a method of manufacturing parallel fiber filters or similar units for purposes other than filtering. The invention has particular application to such filters or units made of glass fibers.

In parallel fiber units of the general type shown, for instance, the Poluskkin U. S. Patent No. 1,885,-762 and in the Swiss Patent No. 129,574 of 1929, compact arrangement of the fibers in parallelism with substantially all of the fibers in longitudinal contact is desired. This arrangement of the fibers provides a multiplicity of substantially uniform spaces between the fibers that form filtrate passages extending lengthwise of the fibers at opposite sides of the lines of longitudinal contact between the fibers.

Difficulties have been encountered in prior attempts to obtain this compact parallel arrangement of glass fibers. If a bundle of glass fibers in which the fibers extend generally in the direction of length of the bundle is subjected to transversely applied pressure, the relatively high friction existing between the surfaces of glass fibers makes it difficult to obtain movement of the fibers, one over the other, and the relatively incompressible nature of such fibers will not allow cross-sectional deformation thereof to assist in obtaining compact relation. These characteristics of the glass fibers have made it necessary heretofore to apply very high pressure to a bundle of fibers to move them into anything approaching compact relation. The means required for applying this pressure complicated the manufacture of parallel fiber units and entailed additional expense. Further, the compacting pressure had no effect in moving fibers that extended in angular relation in the bundle into alignment with the fibers in parallelism, but, instead, tended to bind and clamp them in such angular relation. This arrangement of the fibers in the finished unit frequently reduced its value and efficiency.

As usually manufactured, glass fibers have a tendency to some extent to twist, curve, or curl and this adds further to the difficulty of obtaining compactness and parallelism in the final grouping of the fibers.

It is an object of the present invention to provide a method of making parallel glass fiber units whereby the fibers are brought into parallelism and compact relation to a substantially complete, practicable degree without requiring the application of high compacting pressure.

It is another object of the invention to obtain a compact arrangement of the fibers wherein the fibers hold together in compacted relation without external restraint for sufficient length of time to permit application of banding or sheathing means to the bundle of compact fibers.

It is a further object of the invention to produce a unit of parallel glass fibers held in compact relation by partially fusing together the fibers in the periphery of the unit.

In attaining these objects the present invention comprises applying a liquid, preferably a low viscosity oleaginous substance, to a plurality of fibers arranged loosely in the form of a bundle in which the fibers extend generally in the direction of length of the bundle, in amount sufficient to substantially saturate the bundle. The liquid coats the surfaces of the fibers to allow their easy movement over each other into compact relation. Removal of the excess portion of the liquid from the bundle is then effected in a manner to cause the fibers to be drawn together and to cause angularly related fibers to move into alignment. After compacting, the bundle is bound or sheathed in an approved manner by means such as a cylinder or tube of metal, glass, or other material and the residual liquid removed. The liquid also may serve as a lubricant for the fibers inhibiting mutual abrasion of the fibers.

In the drawing:

Figure 1 is a diagrammatic elevational view of the preferred disposition of the bundle of fibers and the bath of liquid in the first part of the process of the present invention.

Figure 2 is a perspective schematic view of one form of device for removing excess liquid from the bundle and for assisting movement of the fibers into compact relation.

Figure 3 is a perspective view of a compacted bundle of fibers partially inserted in a sheath therefor.

Figure 4 is a perspective view depicting another method of enclosing the bundle of fibers in a sheath.

Figure 5 is an elevational view of the completed sheathed bundle and illustrating the manner of cutting the bundle to form the desired units.

The initial grouping of the fibers into a bundle may be accomplished in any suitable manner. The fibers may be taken directly from the drum on which they were wound during attenuation from the molten glass supply, in which case the cylindrical package of fibers on the drum is cut along a line parallel with the drum axis and the package of fibers unwrapped from the drum surface and laid out in a plane. Other methods may be employed such as combing a plurality of haphazardly arranged fibers to form a loose bundle 10 of fibers 11 extending generally lengthwise of the bundle.

The loose bundle of fibers is substantially saturated with liquid by being drenched therewith or by being immersed in a bath 12 of liquid. If immersed in a bath it is desirable, although not necessary, to draw it from the bath in the direction of its length. The efficiency of the operation is improved if the bundle after being saturated is held in a generally vertical position as illustrated in Figure 1 to lessen the resistance to compacting movement of the fibers by removing gravity as a force to be overcome during such movement. With the bundle in this position, a part of the liquid drains out of the bundle lengthwise thereof and the fibers are caused to draw together to partial extent into compact relation.

Immediately after the bundle 10 is saturated with liquid or, if desired, after it is partially drained as just described it may be clasped by hand near one end to exert a transverse pressure on the bundle sufficient to express most of the liquid, and the hand drawn along the clasped bundle lengthwise thereof while maintaining transverse pressure thereon in what may be called a stripping action, thereby expressing the excess lubricant, aiding in orienting the fibers and assisting movement of the fibers into parallelism and compact relation. This action may be effected by drawing the saturated bundle through a ring or through a notch 14 (Figure 2) shaped to conform to the desired cross-sectional configuration of the compacted bundle. The squeezing exerted on the bundle during stripping need only be sufficient to express the excess portion of the liquid. Such squeezing may be applied by hand in contrast to the pressure heretofore required and which could only be applied by mechanical clamping means.

The term excess liquid as used herein is intended to refer to that part of the liquid that may be removed by a manual squeezing or stripping action and by draining of the liquid from the bundle by gravity. However, more of the liquid may be removed during the compacting operation, for instance by evaporation, without departing from the spirit of the invention.

The compacting action of the liquid in causing the fibers to be drawn together is believed to be due at least in part to the surface tension of the liquid which gives rise to the effect of capillarity on adjacent fibers to cause them to draw together. Fibers originally extending in angular relation to each other are caused to move toward parallelism by this same effect. The compacting action may also be due in part to the fact that the liquid in leaving the bundle causes the fibers to be moved by atmospheric pressure acting on the external surface of the bundle toward each other to take the place of the liquid removed, the liquid between the fibers at the periphery of the bundle preventing entry of air into the bundle.

The liquid also acts to assure easy movement of the fibers over each other, and the weighing down of the fibers by the liquid overcomes to some extent their tendency to twist and curl so that they are aligned and straightened out and thus aided in their movement into compact relation. The fibers remain in this compacted relation while there is sufficient liquid in the bundle to cause them to hold together so that the bundle may be handled to some extent during subsequent operations without disturbing the compact arrangement.

The liquid should be one having a fair amount of surface tension to aid in drawing the fibers together and to hold the filaments together to prevent air from entering into the bundle. It should also be of the lowest possible viscosity while still acting as above described so that the coating of liquid on the fibers will not prevent the fibers from being moved into close relation. Such a liquid may be, for instance, a very light mineral oil. Satisfactory results are also obtained by using kerosene, gasoline, toluol, ether, tricresyl phosphate, or like substances. Water may be employed if soap is mixed therewith to increase its surface tension, the soap also imparting lubricating properties to the water. Water may also be employed in water and oil emulsions. Or alcohol having compatible soaps added thereto can be used.

The bundle after compacting may be sheathed by being pushed or pulled endwise into a tube of suitable material or may be wrapped with tape of metal, cloth, or other material to permanently hold the fibers together.

The sheath may be in the form of a tube 15 (Figure 3) split lengthwise as at 16 along one side so that it may be expanded in cross-sectional size. With this form of sheath, the bundle immediately after being saturated may be placed in the split tube and the tube closed on the filaments and secured in closed relation as by welding. If desired, a tube 115 may be divided into halves 116, 117, as illustrated in Figure 4, and the bundle of fibers with liquid therein placed between the halves and the halves pressed together. Closing of the tube on the bundle in either form acts to express excess liquid therefrom and aids in orienting and compacting the fibers. This closing may be effected by hand, if desired, since only sufficient force need be applied to express the excess liquid.

It is also possible to draw the saturated bundle immediately after saturation into a tube having a flared end and thus strip the bundle to express excess liquid and enclose it in the tube in a single operation.

The sheathed bundle itself is adapted to be used as a filter unit or for other purposes but is preferably cut transversely into a plurality of slabs 18 (Figure 5) to form units each composed of a multiplicity of parallel glass fibers enclosed in a frame or band of desired configuration.

Instead of sheathing the bundle as described, the compact bundle may be held permanently in compact relation in any other suitable manner. For example, the fibers in the bundle may be held together by sintering the fibers throughout the bundle or by sintering the fibers in the periphery of the bundle. Sintering of the fibers in the outer periphery of the compacted bundle is preferably effected by heating the fibers in the outer surface of the bundle to sintering temperature by means of a flame directed onto the outer surface. It may also be produced by bringing a heated element into contact with the outer surface or by heating the bundle in a suitable oven.

All remaining liquid may be removed from the bundle after the bundle has been secured in compact relation or from the units after the bundle has been cut into a plurality of slabs. If volatile, the liquid may be allowed to evaporate from the compacted bundle, or the liquid may be allowed to remain until washed out by the filtrate if circumstances permit. Substances such as hydrocarbon oil can best be removed by heating the bundle to decompose and oxydize the oil, but they may be flushed out with suitable solvents and the solvent in turn removed by being evaporated or by being volatilized by heating.

Tests have been conducted to determine the amount of compacting obtained by the method of the present invention and indicate that the degree of compacting obtained by this method is substantially as high as can be obtained by any amount of pressure on the bundle short of destroying the glass fibers.

Although the units produced in accordance with the present invention have been described as filters there are other obvious uses to which compact bundles of parallel fibers may be put. When bonded in such form elongated bundles may form structural members or decorative columns. Thin slabs cut from such bundles have been found suitable as acoustic means, light conveying means, or diffusing screens which may be used alone or between plates of glass to form lighting panels, such as disclosed, for instance, in Patent No. 999,112 and Patent No. 2,011,252.

Various modifications of the preferred form of the invention may be resorted to within the spirit of the invention as defined in the following claims.

I claim:

1. The method of making parallel glass fiber units which comprises forming a loose bundle of fibers in which the fibers extend generally in the direction of length of the bundle, immersing said bundle in a bath of low viscosity liquid, drawing said bundle from the bath in the direction of length of the bundle, subjecting said bundle to a transverse pressure applied progressively lengthwise thereof to remove excess liquid and urge the fibers into compact relation, and fixing said bundle in such compact relation.

2. The method of making parallel glass fiber units which comprises forming a bundle of fibers in which the fibers extend generally in the direction of length of the bundle, immersing said bundle in a bath of low viscosity liquid, drawing said bundle from the bath in the direction of length of the bundle, subjecting said bundle to a transverse pressure applied progressively lengthwise thereof to remove excess liquid and urge the fibers into compact relation, fixing said bundle in such compact relation, and dividing said bundle transversely to its length into a plurality of units.

3. The method of making parallel glass fiber units which comprises forming a bundle of a quantity of fibers in which fibers extend generally in the direction of length of the bundle, immersing the bundle in a bath of a low viscosity liquid and withdrawing said bundle from said bath in the direction of length of the bundle, subjecting said bundle to a transverse pressure applied progressively lengthwise thereof to express a part of the liquid therefrom whereby the fibers are urged into compact relation, disposing said bundle between the parts of a bundle-enclosing sheath separated along lines extending substantially in the direction of length of the bundle, moving the parts of the sheath together with only sufficient force to express the excess liquid thereby additionally compacting the fibers, and securing said parts of said sheath together.

4. The method of making parallel glass fiber units which comprises forming a bundle of fibers in which the fibers extend generally in the direction of length of the bundle, immersing the bundle in a bath of a low viscosity liquid and withdrawing said bundle from said bath in the direction of length of the bundle, subjecting said bundle to a transverse pressure applied progressively lengthwise thereof to express a part of the liquid therefrom whereby the fibers are urged into compact relation, disposing said bundle between the parts of a bundle-enclosing sheath separated along lines extending substantially in the direction of length of the bundle, moving the parts of the sheath together with only sufficient force to express the excess liquid thereby additionally compacting the fibers, securing the parts of the sheath together, dividing said sheathed bundle transversely to its length into a plurality of slabs to form said units, and removing the residual liquid from the spaces between the fibers in said units.

5. The method of making parallel fiber filters which comprises forming a loose bundle of fibers in which the fibers extend generally in the direction of length of the bundle, immersing the bundle in a bath of a low viscosity liquid and withdrawing said bundle from said bath in the direction of length of the bundle, subjecting said bundle to a transverse pressure applied progressively lengthwise thereof to express a part of the liquid therefrom whereby the fibers are urged into compact relation, disposing said bundle in a tube whose wall is split at least along one line extending in the general direction of the axis of the tube and expanded diametrically, closing the tube on the bundle with only sufficient force to express excess liquid from the bundle thereby additionally compacting the fibers, and securing said tube in closed relation.

6. The method of forming parallel fiber units which comprises forming a bundle in which the fibers extend generally in the direction of length of the bundle, applying a liquid to the bundle in an amount at least sufficient to substantially saturate the bundle, subjecting said bundle to a transverse pressure applied progressively lengthwise and from end to end of the bundle to cause at least a part of the liquid to flow from the bundle in a direction generally lengthwise thereof whereby the fibers are urged into alignment and compact relation, subsequently placing the compacted bundle in an enclosing tube and securing it therein, and dividing said enclosed bundle along planes transverse to its length into a plurality of slabs to form said units.

ALLEN L. SIMISON.